US006567884B1

(12) United States Patent
Rezeanu

(10) Patent No.: US 6,567,884 B1
(45) Date of Patent: May 20, 2003

(54) ENDIAN-CONTROLLED COUNTER FOR SYNCHRONOUS PORTS WITH BUS MATCHING

(75) Inventor: Stefan-Cristian Rezeanu, Colorado Springs, CO (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/531,241

(22) Filed: Mar. 21, 2000

(51) Int. Cl.[7] .............................................. G06F 13/38
(52) U.S. Cl. ..................... 710/315; 710/65; 711/201
(58) Field of Search ................................. 710/315, 104, 710/307, 100, 65; 711/201, 202

(56) References Cited

U.S. PATENT DOCUMENTS

| 4,286,321 A | * | 8/1981 | Baker et al. ................ 710/104 |
| 5,550,987 A | | 8/1996 | Tanaka ........................ 395/286 |
| 5,572,713 A | | 11/1996 | Weber et al. ................ 395/500 |
| 5,574,923 A | * | 11/1996 | Heeb et al. .................... 710/65 |
| 5,600,814 A | * | 2/1997 | Gahan et al. ............... 710/307 |
| 5,630,084 A | * | 5/1997 | Ikumi ......................... 712/200 |
| 5,828,853 A | * | 10/1998 | Regal .......................... 710/315 |
| 5,848,436 A | | 12/1998 | Sartorius et al. ............ 714/154 |
| 5,867,672 A | * | 2/1999 | Wang et al. ................. 710/307 |
| 5,867,690 A | * | 2/1999 | Lee et al. ...................... 710/65 |
| 5,907,865 A | * | 5/1999 | Moyer ......................... 711/201 |
| 5,937,170 A | * | 8/1999 | Bedarida ..................... 710/100 |

OTHER PUBLICATIONS

CMOS Bus–Matching SyncFIFO™ 256×36, 512×36, 1,024×36; Preliminary IDT723623, IDT723633, IDT723643; Integrated Device Technology, Inc.; May 1998; pp. 1–28.

* cited by examiner

*Primary Examiner*—Rupal Dharia
(74) *Attorney, Agent, or Firm*—Christopher P. Maiorana, P.C.

(57) ABSTRACT

An apparatus comprising a memory, a first circuit and a second circuit. The memory may be configured to read and/or write data to/from one or more ports. The first circuit may be configured to bi-directionally transfer data between an external I/O bus and an internal I/O bus in response to a plurality of control signals. The second circuit may be configured to generate the plurality of control signals in response to a plurality of input signals. The data signals generated by the two circuits may allow reduced bus size access in one or more word formats.

13 Claims, 5 Drawing Sheets

ENDIAN-CONTROLLED COUNTER FOR SYNCHRONOUS PORTS WITH BUS MATCHING

CROSS-REFERENCE TO RELATED APPLICATIONS

The present invention may relate to co-pending application Ser. No. 09/531,365 filed concurrently, which is hereby incorporated by reference in its entirety.

FIELD OF THE INVENTION

The present invention relates to memory devices generally and, more particularly, to an endian-controlled counter for single/multi synchronous port(s) with bus matching.

BACKGROUND OF THE INVENTION

Bus matching generally involves converting data from one format to another (e.g., x36 (long word), x18 (word) or x9 (byte)) in order to be transferred through a fixed bus width. Bus matching facilitates a single bus servicing multiple memory configurations. Bus matching was previously available only for FIFO applications.

Conventional methods of bus matching implement an auxiliary register to store the unused portion of the long-word. Auxiliary registers are effective at bus matching but also have several disadvantages. Auxiliary registers (i) use up additional processor time after data is fetched, time allotted to execute the instruction cycles necessary for subsequent byte manipulation, (ii) require the use of complex and/or expensive circuitry to process the long-word data after the data is made available externally in the internal format, and/or (iii) require unnecessary auxiliary internal storage registers which increase power consumption and area allocation for the endian manipulation circuitry.

In order to manage the handling of both endian standards, conventional methods have included:

a) byte-swapping devices which selectively swap the bytes (e.g., x9) of data transferred (usually between a processor and the storage device), controlled by addresses provided by the processor;

b) memory managers to receive lines of data from the memory based on the specific endian mode of operation;

c) data processing devices that receive one or more bytes of data in parallel from the memory, and are able to perform manipulation of the bytes of data, usually making use of a bit reversing circuit and a word reversing circuit;

d) manipulation of the two LSBs of the access address to change pointer values, and thus point to the correct sub-word data;

e) computer program-products (i.e., software implementation), that take the contents of a register and operate on the two LSBs of the byte address to generate a new byte address that corresponds with another architecture;

f) converters for assembling data stored in a register according to endian formats stored in a second register; and/or g) auxiliary registers to store the unused portion of the long-word, during a specific clock cycle, for specific manipulation during subsequent clock cycles.

Conventional methods for manipulating a long word are less than adequate. Additional time is required after fetching a long word either through specific hardware or through software manipulation routines (e.g., additional processor time allotted to execute the instruction cycles). Complex and expensive circuitry is used to process the long-word data after it, is made available externally. Auxiliary internal storage registers increase the power consumption and area allocation for the endian-manipulation circuitry.

SUMMARY OF THE INVENTION

The present invention concerns an apparatus comprising a memory, a first circuit and a second circuit. The memory may be configured to read and/or write data to/from one or more ports. The first circuit may be configured to transfer data between an external I/O bus and an internal I/O bus in response to a plurality of control signals. The second circuit may be configured to generate the plurality of control signals in response to a plurality of input signals. The data signals generated by the two circuits may allow reduced bus size access in one or more word formats.

The objects, features and advantages of the present invention include providing a circuit, architecture, and method for (i) matching a bus width in a memory, (ii) implementing data transfer in one or more word formats and/or (iii) implementing the bus matching and/or data transfer in a single/multi port memory.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
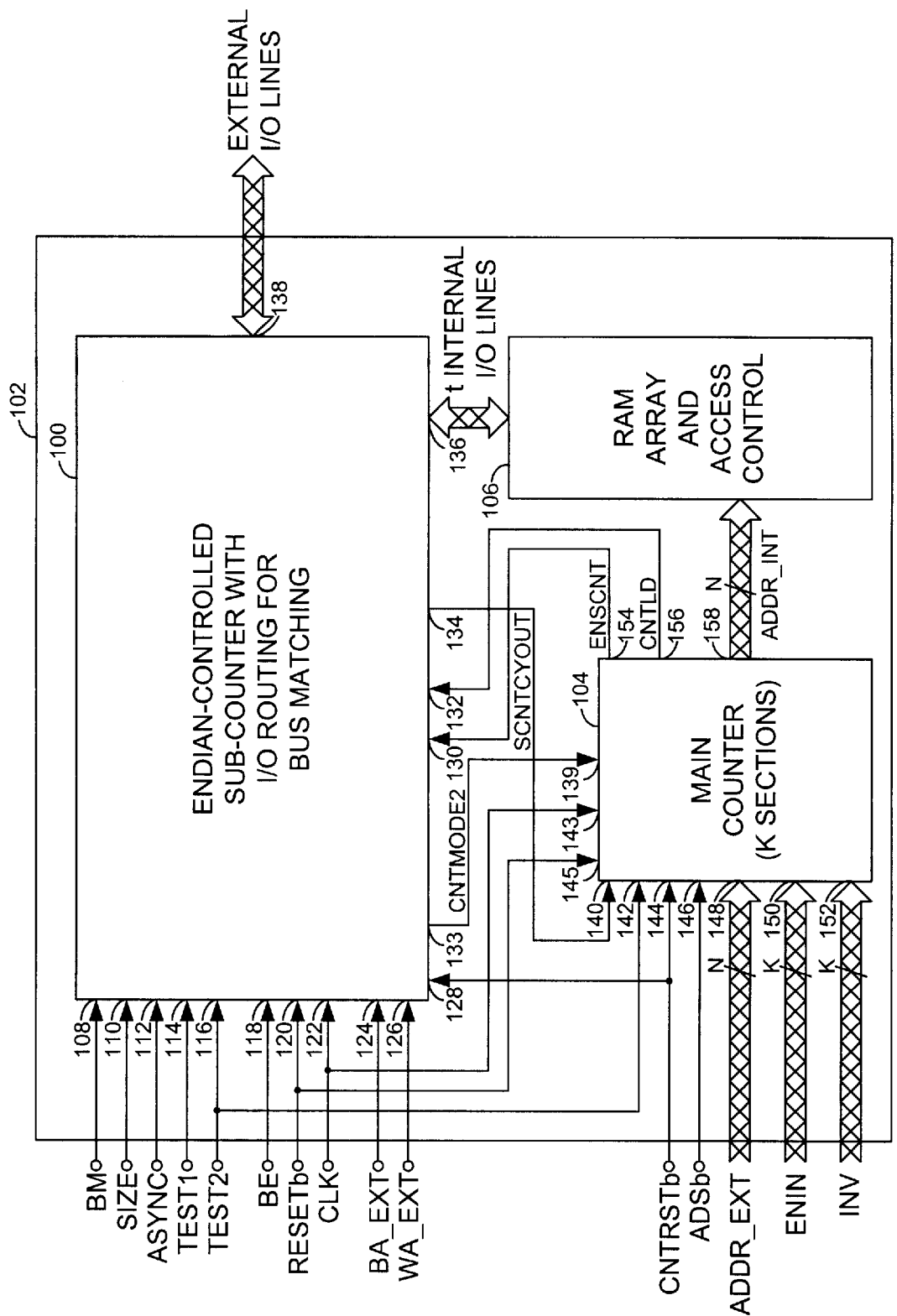
FIG. 1 is a block diagram of a preferred embodiment of the present invention.

Referring to FIG. 1, a circuit 100 is shown in accordance with a preferred embodiment of the present invention. The circuit 100 may be implemented, in one example, as an endian-controlled sub-counter with I/O routing control for synchronous/asynchronous ports with bus matching. The circuit 100 is shown implemented in the context of a memory device 102. The circuit 100 may be configured to operate with a circuit 104 and a circuit 106. The circuit 104 may be, in one example, a main address counter/register of the memory device 102. The circuit 106 may be, in one example, a RAM array (including access control circuitry) of the memory device 102. In one example, the circuit 106 may be a synchronous memory.

The circuit 100 may have an input 108, an input 110, an input 112, an input 114, an input 116, an input 118, an input 120, an input 122, an input 124, an input 126, an input 128, an input 130, an input 132, an output 133, an output 134, an input/output 136 and an input/output 138. A control signal (e.g., a bus mode matching select signal BM) may be presented to the input 108. The signal BM may be used, in one example, to control whether a bus matching function is on or off. If the bus matching function is off, the circuit 100 will generally present data to the external data bus at the same width as the data that is stored in the memory array 106.

A control signal (e.g., a bus format sizing signal SIZE) may be presented to the input 110. The signal SIZE may be used, in one example, to select the width at which data will be presented to the external I/O bus when bus matching is active. The signal SIZE may by one or more bits wide. In one example, the signal SIZE is one bit wide and may select between 9-bit and 18-bit transfers to the external data bus. However, the present invention may be implemented to match between ever increasing memory array widths and narrower I/O buses by scaling (e.g., increasing or decreasing) the number of bits in a sub-counter.

A mode signal (e.g. ASYNC) may be presented to the input 112. The signal ASYNC may be used to select an operational mode of the circuit 100 that provides asynchronous access to the RAM array 106. When the signal ASYNC is in an active state, (i) the sub counter may be disabled, and (ii) the signals WA_EXT and BA_EXT may be selected for use in selecting a portion of the data retrieved from the RAM array 106 to be placed on the external I/O bus.

A first test signal (e.g., TEST1) and a second test signal (e.g., TEST2) may be presented to the inputs 114 and 116, respectively. The test signals TEST1 and TEST2 may be used to activate different testing modes of the circuit 100 (e.g., the signal TEST1 may be active during sort test and the signal TEST2 may be active during class test). A control signal (e.g., BE) may be presented to the input 118. The signal BE may be used to select an endian mode for transferring data from the memory array 106 to the external I/O bus. In a first state, the signal BE may select a big-endian format. In a second state, the signal BE may select a little-endian format.

A control signal (e.g., RESETb) may be presented to the input 120. The signal RESETb may be, in one example, a power on reset (POR) signal. In another example, the signal RESETb may be the logic AND combination of an active low signal PORb and another active low asynchronous signal MRb (master reset). A clock signal (e.g., CLK) may be presented to the input 122. A control signal (e.g., BA_EXT) may be presented to the input 124. The signal BA_EXT may be used to select byte-size portions of the data retrieved from the RAM array 106 for presentation to the external I/O bus. A control signal (e.g., WA_EXT) may be presented to the input 126. The signal WA_EXT may be used to select word-size portions of the data retrieved from the memory array 106 for presentation on the external I/O bus.

A counter reset signal (e.g., CNTRSTb) may be presented to the input 128. The signal CNTRSTb may be used, in one example, to synchronously reset the sub-counter (to be described in more detail in connection with FIG. 4). An enable signal (e.g., ENSCNT) may be presented to the input 130. The signal ENSCNT may be used to enable the increment/decrement operation of the sub-counter. A control signal (e.g., CNTLD) may be presented to the input 132. The signal CNTLD may be used to reset the sub-counter when an address is loaded into the main counter 104.

A mode signal (e.g., CNTMODE2) may be generated at the output 133 (to be described in more detail in connection with FIG. 2). A control signal (e.g., SCNTCYOUT) may be generated at the output 134. The signal SCNTCYOUT may be used to enable the increment/decrement operation of the main counter 104. The signal SCNTCYOUT may indicate a carry/borrow condition of the sub-counter. An internal I/O bus may be connected to the circuit 100 at the input/output 136. The internal I/O bus may have t lines, usually the dimension of the memory array width. In one example, the internal I/O bus may be 36 bits wide. However, other bit widths may be implemented accordingly to meet the design criteria of a particular, implementation. An external I/O bus may be connected to the circuit 100 at the input/output 138. The external I/O bus may be t-bits wide. However, in particular applications, the external I/O bus may be 9, 18, 36 bits or m-bits wide. The circuit 100 may be configured to bi-directionally transfer data between the external I/O bus and the internal I/O bus in response to a plurality of control signals. The data may be bi-directionally transferred between the external and internal buses according to either a first word format (e.g., a big endian format) or a second word format (e.g., little endian format).

In addition to the inputs labeled 120 (RESETb) and 122 (CLK) described in relation to the circuit 100, the circuit 104 may have an input 139, an input 140, an input 142, an input 143, an input 144, an input 145, an input 146, an input 148, an input 150, an input 152, an output 154, an output 156, and an output 158. The signal CNTMODE2 may be presented to the input 139 (to be described in connection with FIG. 2). The signal SCNTCYOUT may be presented to the input 140. The signal TEST2 may be presented to the input 142. The signal CLK may be presented to the input 143. The signal CNTRSTb may be presented to the input 144. The signal RESETb may be presented to the input 145. A parallel address load control signal (e.g., an address strobe signal ADSb) may be presented to the input 146. An external address signal (e.g., ADDR_EXT) may be presented to the input 148. The signal ADDR_EXT may be n-bits wide, where n is an integer. An enable signal (e.g., ENIN) may be presented to the input 150. The signal ENIN may be k-bits wide. An increment/decrement control signal (e.g., INV) may be presented to the input 152. The signal INV may be K-bits wide. The circuit 104 may be configured to generate (i) the sub-counter enable signal ENSCNT, (ii) the sub-counter control signal CNTLD, and (iii) a synchronous internal address signal (e.g., ADDR_INT). The signal ADDR_INT may be n-bits wide.

Figure 2:
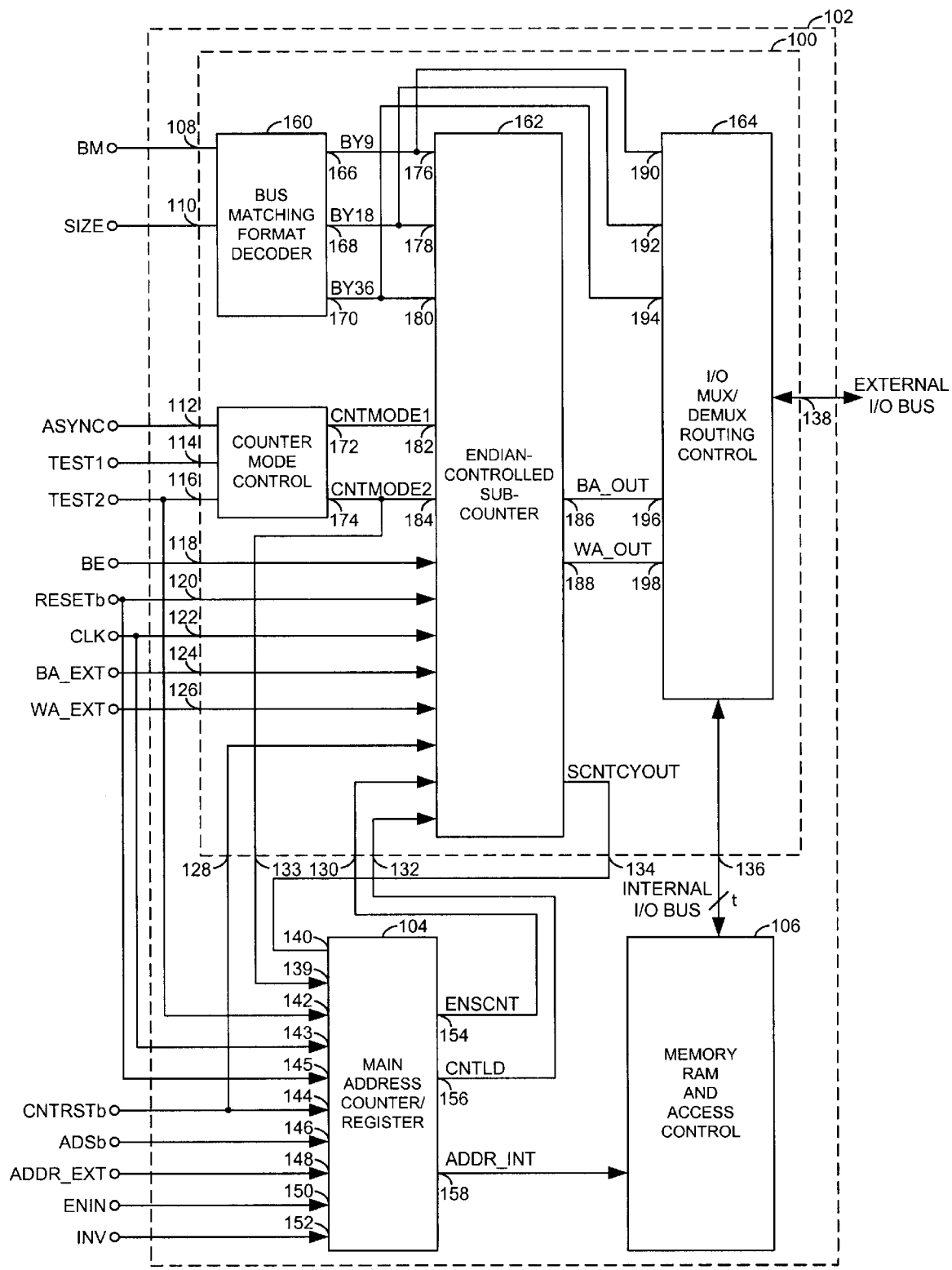
FIG. 2 is a detailed block diagram illustrating the circuit of FIG. 1.

Referring to FIG. 2, a more detailed block diagram of the circuit 100 is shown. The circuit 100 may comprise a circuit 160, a circuit 161, a circuit 162, and a circuit 164. The circuit 160 may be implemented, in one example, as a bus matching format decoder circuit. The circuit 161 may be implemented, in one example, as a counter mode control circuit. In general, the circuit 161 may be internal or external to the circuit 100. The circuit 162 may be implemented, in one example, as an endian-controlled sub-counter circuit. The circuit 164 may be implemented, in one example, as an I/O multiplexer/demultiplexer routing control circuit. The circuit 160 may have an output 166, an output 168, and an output 170. The circuit 160 may be configured, in one example, to generate three bus formatting signals (e.g., x9, x18, and x36) in response to the signal BM and the signal SIZE. However, the circuit 160 may be configured to generate additional bus formatting signals depending on the width of the signal SIZE. The signals x9, x18, and x36 may be presented at the outputs 166, 168 and 170, respectively.

The circuit 161 may be configured, in one example, to generate a first mode signal (e.g., CNTMODE1) at an output 172 and a second mode signal (e.g., CNTMODE2) at an output 174 in response to the signals ASYNC, TEST1, and TEST2. In one example, CNTMODE1 may be used to force the sub-counter in a predetermined endian mode (e.g., little endian) as well as a predetermined state (e.g., reset) if the memory device operates asynchronously or is put in a sort test mode. Additionally, the external control signals WA_EXT and BA_EXT (rather than sub-counter generated signals) may, in one example, be routed to control the I/O routing in the circuit 164. In one example, CNTMODE2 may be used to reset the sub-counter as well as all the sections of the counter if the memory device operates asynchronously and is not put in a class test mode.

The circuit 162 may have an input 176, an input 178, an input 180, an input 182, an input 184, an output 186, and an output 188. The signals x9, x18, x36, CNTMODE1 and CNTMODE2 are generally presented to the inputs 176, 178, 180, 182 and 184, respectively. The signals BE, RESETb, CLK, BA_EXT, WA_EXT,, CNTRSTB, ENSCNT, and CNTLD are generally presented to the circuit 162. The circuit 162 may be configured, in one example, to generate (i) the signal SCNTCYOUT, (ii) a first output signal (e.g., BA_OUT), and (iii) a second output signal (e.g., WA_OUT). However, the circuit 162 may also be configured to generate additional output signals needed to meet the number of bus matching modes of a particular application. The signals BA_OUT and WA_OUT may be used as additional address signals to select portions of data retrieved from the memory array 106 to be presented in a particular required width to the external I/O bus.

The circuit 164 may have an input 190, an input 192, an input 194, an input 196 and an input 198. The signal x9 may be presented to the input 190. The signal x18 may be presented to the input 192. The signal x36 may be presented to the input 194. The signal BA_OUT may be presented to the input 196. The signal WA_OUT may be presented to the input 198. The circuit 164 may be configured, in one example, to transfer data bi-directionally between the external I/O bus and the internal I/O bus in response to one or more of the signals x9, x18, x36, BA_OUT, and WA_OUT. However, the circuit 164 may be configured to respond to as many output signals from the circuit 162 as are needed to meet the bus matching requirements of a particular application.

Figure 3:
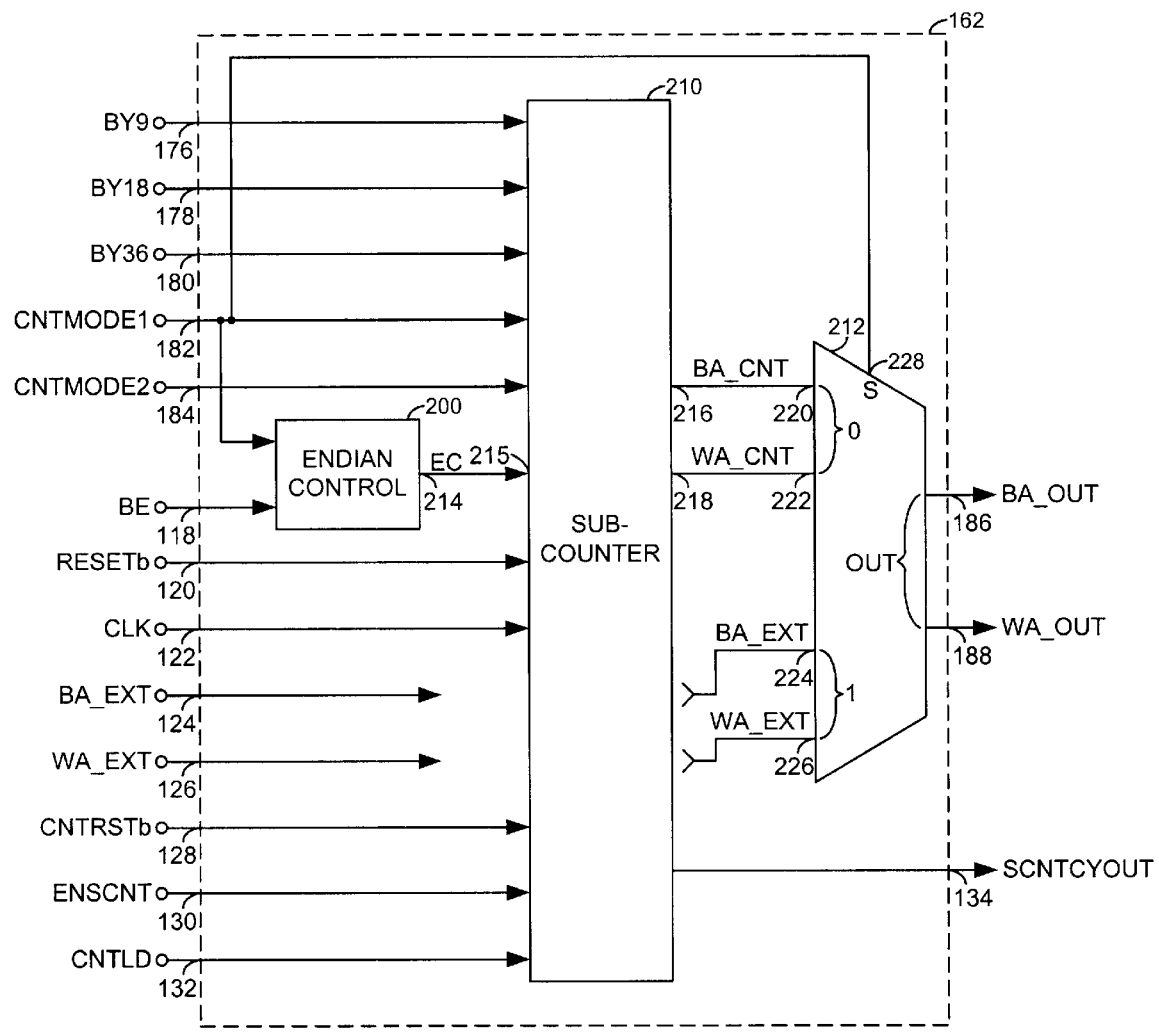
FIG. 3 is a detailed block diagram illustrating an endian-controlled sub-counter of FIG. 2.

Referring to FIG. 3, a more detailed diagram of the circuit 162 is shown. The circuit 162 may comprise a circuit 200, a circuit 210, and a circuit 212. The circuit 200 may be implemented, in one example, as an endian control circuit. The circuit 210 may be implemented, in one example, as a sub-counter circuit. The circuit 190 may be implemented, in one example, as a multiplexer circuit. The circuit 200 generally receives the signal BE at a first input and the signal CNTMODE1 at a second input. The circuit 200 may be configured to generate an endian control signal (e.g., EC) at an output 214 in response to the signal BE and the signal CNTMODE1.

The circuit 210 generally receives the signal EC at an input 215, the signal CNTMODE1, the signal CNTMODE2, the signal x9, the signal x18, the signal x36, the signal CLK, the asynchronous signal RESETb, the synchronous signal CNTRSTb, the signal ENSCNT and the signal CNTLD. The circuit 210 may be configured to generate a first output signal (e.g., BA_CNT) at an output 216, a second output signal (e.g., WA_CNT) at an output 218 and the signal SCNTCYOUT. The signal BA_CNT may be presented to an input 220 of the circuit 212. The signal WA_CNT may presented to an input 222 of the circuit 212. The signal BA_EXT may be presented to an input 224 of the circuit 212. The signal WA_EXT may be presented to an input 226 of the circuit 212. The circuit 212 generally receives the signal CNTMODE1 at a select control input 228. The circuit 212 may be configured to select (i) the sub-counter generated signals BA_CNT and WA_CNT or (ii) the external control signals BA_EXT and WA_EXT as the signal BA_OUT and the signal WA_OUT, respectively, in response to the signal CNTMODE1.

Figure 4:
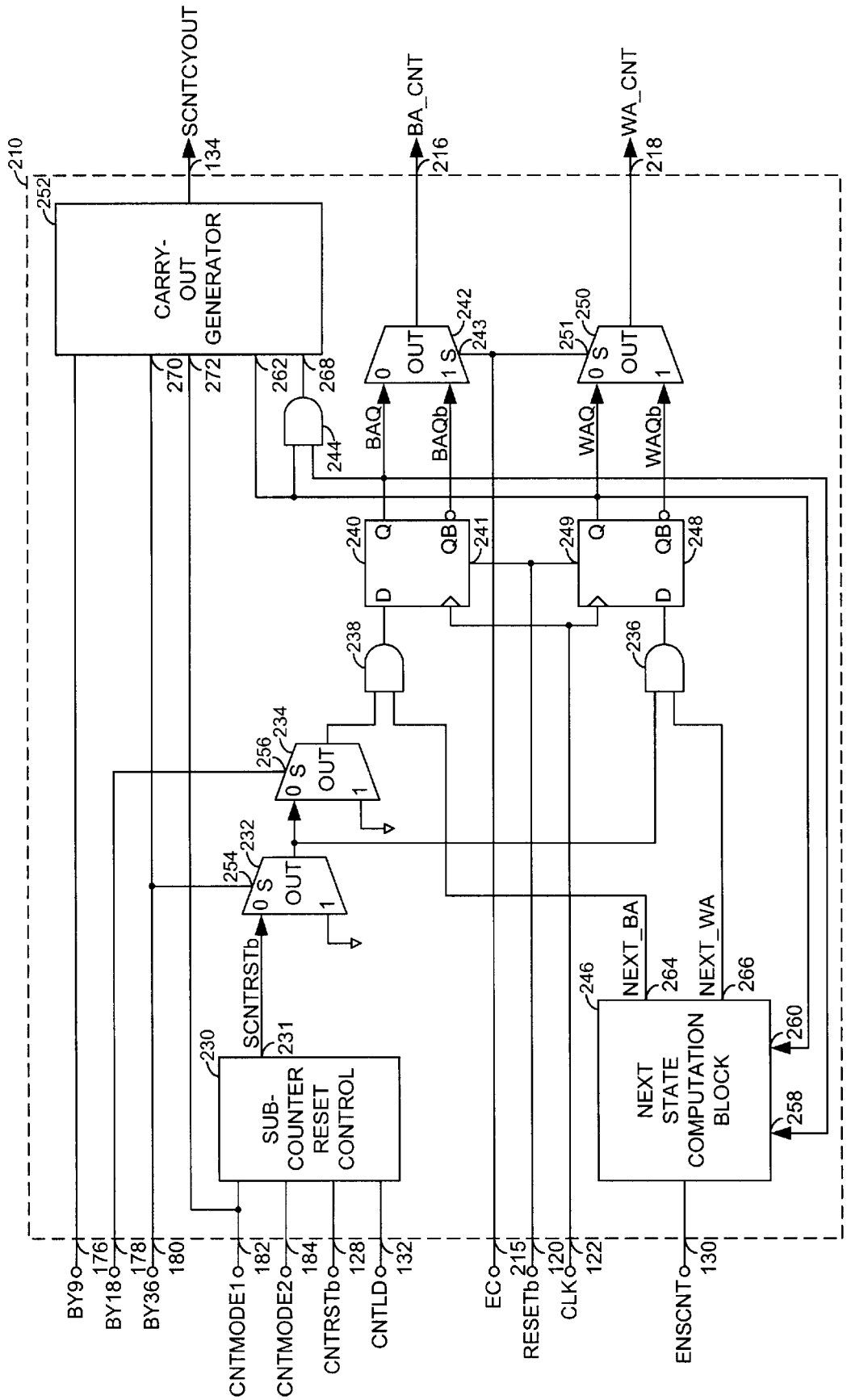
FIG. 4 is a detailed diagram of a sub-counter of FIG. 3.

Referring to FIG. 4, a particular detailed diagram of a circuit implementing the functionality of the circuit 210 is shown. The circuit 210 generally comprises a circuit 230, a multiplexer 232, a multiplexer 234, a gate 236, a gate 238, a flip-flop 240, a multiplexer 242, a gate 244, a circuit 246, a flip-flop 248, a multiplexer 250, and a circuit 252. The signals CNTMODE1, CNTMODE2, CNTRSTb, and CNTLD are generally presented to the circuit 230. The circuit 230 may be configured, in one example, to generate a sub-counter reset control signal (e.g., SCNTRSTb) at an output 231. The signal SCNTRSTb may be used to reset the flip flops 240 and/or 248, and subsequently set or reset the signals BA_CNT and WA_CNT depending on the state of the endian control signal EC. The signal SCNTRSTb is generally presented to a first input of the multiplexer 232. A second input of the multiplexer 232 is generally connected to a ground potential (e.g., VSS). The signal x36 is generally presented to a select control input 254 of the multiplexer 232. When the signal x36 is at a first state (e.g., a logical "0", or LOW), the multiplexer 232 may select the signal SCNTRSTb as an output signal. When the signal x36 is at a second state (e.g., a logical "1", or HIGH), the multiplexer 232 may select the ground potential as the output signal. The output of the multiplexer 232 is generally connected to (i) a first input of the multiplexer 234 and (ii) a first input of the gate 236. The gate 236 may be implemented, in one example, as a two-input AND gate. However, other types of gates may be implemented to meet the design criteria of a particular application.

A second input of the multiplexer 234 is generally connected to the ground potential VSS. The signal x18 is generally presented to a select control input 256 of the multiplexer 234. When the signal x18 is in a first state (e.g., a logic "0", or LOW), the multiplexer 234 may select the signal at the first input as the output signal. When the signal x18 is in a second state (e.g., a logic "1", or HIGH), the multiplexer 234 may select the ground potential VSS as the output signal. The output of the multiplexer 234 is generally connected to a first input of the gate 238.

The gate 238 may be implemented, in one example, as a two-input AND gate. However, other types of gates may be implemented accordingly to meet the design criteria of a particular application. A control signal (e.g., NEXT_BA) may be presented to a second input of the gate 238. An output of the gate 238 is generally connected to a D-input of the flip-flop 240. The flip-flop 240 may be implemented, in one example, as a D-type flip-flop. However, other types of flip-flops and/or latches may be implemented according to the design criteria of a particular application. The signal CLK is generally presented to a clock input of the flip-flop 240. The signal RESETb is generally presented to a control input 241 of the flip-flop 240. A signal (e.g., BAQ) is generally presented at a Q output of the flip-flop 240. The signal BAQ is generally presented to a first input of the multiplexer 242, a first input of the gate 244, and an input 258 of the circuit 246. A digital complement of the signal BAQ (e.g., BAQb) is generally presented at a Qb output of the flip-flop 240. The signal BAQb is generally presented to a second input of the multiplexer 242. The signal EC is generally presented to a select control input 243 of the multiplexer 242. The multiplexer 242 generally selects (i) the signal BAQ or (ii) the signal BAQb as the signal BA_CNT in response to the signal EC. When the signal EC is in a first state (e.g., a logic "0", or LOW), the multiplexer 242 generally selects the signal BAQ as the output signal BA_CNT. When the signal EC is in a second state (e.g., a logic "1", or HIGH), the multiplexer 242 generally selects the signal BAQb as the output signal BA_CNT.

and BAQb. The signals BA_CNT and WA_CNT may provide incrementing or decrementing address signals, respectively, as shown in the following TABLE 1:

TABLE 1

|  | x36 = 0 x18 = 0 x9 = 1 | | | | |
|---|---|---|---|---|---|
|  | EC = 0 | | EC = 1 | | |
|  | WA_CNT | BA_CNT | WA_CNT | BA_CNT | SCNTCYOUT |
| first CLK | 0 | 0 | 1 | 1 | 0 |
| second CLK | 0 | 1 | 1 | 0 | 0 |
| third CLK | 1 | 0 | 0 | 1 | 0 |
| fourth CLK | 1 | 1 | 0 | 0 | 1 |

An output of the gate 236 is generally connected to a D-input of the flip-flop 248. The flip-flop 248 may be implemented, in one example, as a D-type flip-flop. However, other types of flip-flops and/or latches may be implemented accordingly to meet the design criteria of a particular application. The signal CLK is generally presented to a clock input of the f lip-flop 248. The signal RESETb is generally presented to a control input 249 of the flip-flop 248. A signal (e.g., WAQ) is generally presented at a Q output of the flip-flop 248. A digital complement of the signal WAQ (e.g., WAQb) is generally presented at a Qb output of the flip-flop 248.

The signal WAQ is generally presented to a first input of the multiplexer 250, a second input of the gate 244, an input 260 of the circuit 246, and an input 262 of the circuit 252. The signal WAQb is generally presented to a second input of the multiplexer 250. The multiplexer 250 may be configured to select (i) the signal WAQ, or (ii) the signal WAQb as the output signal WA_CNT in response to the signal EC. The signal EC is generally presented to a select control input 251 of the multiplexer 250. When the signal EC is LOW, the multiplexer generally selects the signal WAQ as the output signal WA_CNT. When the signal EC is HIGH, the multiplexer generally selects the signal WAQb as the output signal WA_CNT.

The circuit 246 may be configured, in one example, to generate a first state signal (e.g., NEXT_BA) and a second state signal (e.g., NEXT_WA) in response to the signals ENSCNT, WAQ, and BAQ. The signal NEXT_BA is generally presented to a second input of the gate 238. The signal NEXT_WA is generally presented to a second input of the gate 236. In a particular application, when the signal ENSCNT is active, the binary output pair (266,264) may be the 2-bit binary incremented state with respect to the binary input pair (260,253).

The circuit 252 may be configured, in one example, to generate the signal SCNTCYOUT in response to one or more of (i) the signal x9, (ii) the signal x36, (iii) the signal CNTMODE1, (iv) the signal WAQ, and/or (v) a logical combination of the signals BAQ and WAQ. Depending on the chosen bus matching format, the signal SCNTCYOUT is generated by the circuit 252 in such a way that it becomes active when the sub-counter reaches its maximum or minimum state (depending on whether little or big endian mode is selected).

The sub-counter 210 generally increments in response to the signal CLK. The signal EC may be used to select the signals WAQ and BAQ or the digital complements WAQb and BAQb.

In the TABLE 1 illustration, EC is active (high) when big endian mode is selected, and SCNTCYOUT becomes active on the last row (corresponding to the fourth clock period). When the bus matching mode x18 is selected, the signal BAQ will generally be in a first state (e.g., a logic "0", or LOW), BA_CNT will remain at a logic state dependant on the logic value of EC, and the signal WA_CNT will generally count out the words. When the signal x36 is in a second state (e.g., a logic "1", or HIGH), both the signals BAQ and WAQ will generally be in a first state (e.g., a logic "0"or LOW), and none of the signals BA_CNT and WA CNT will count, being stable at a logic level which depends on the logic value of EC.

Figure 5:
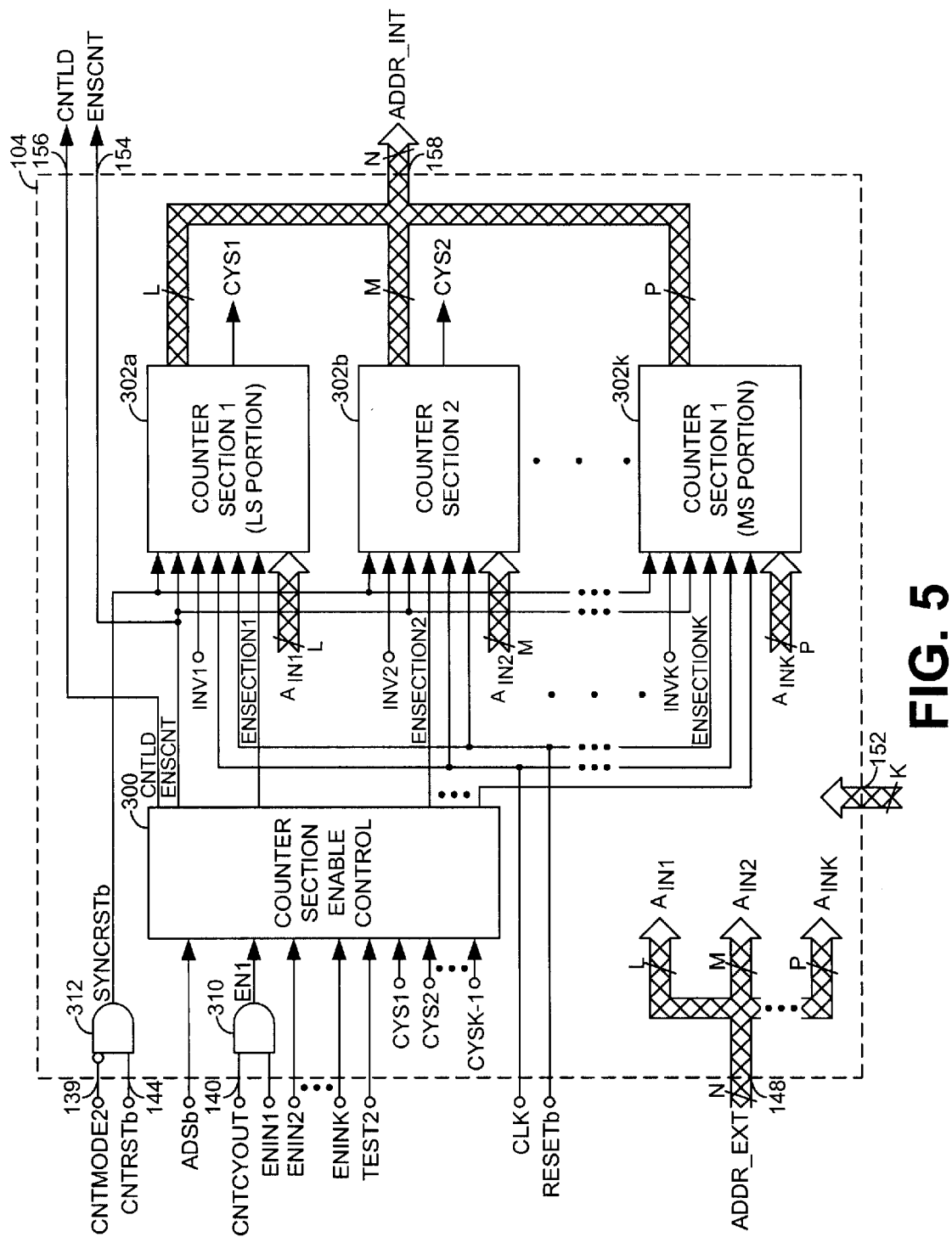
FIG. 5 is a detailed block diagram illustrating a main address counter/register of FIG. 1.

Referring to FIG. 5, a detailed block diagram of the circuit 104 of FIG. 1 is shown. The circuit 104 generally comprises a counter section enable control circuit 300 and a number of counter sections 302a–302k. In one example, the counter section 302a may implement the least significant (LS) portion. The counter section 302k may implement the most significant portion. In general, the counter sections 302a–302k provide contiguous blocks of addresses, enabling cycling through specific portions of the RAM array 106. The least significant signal of the ENIN bus (k lines) is generally combined in a circuit 310 with input 140 (e.g., SCNTCYOUT) to generate the internal least significant enable control signal EN1. In one example, the circuit 310 may be a logic AND gate, however, other logic gates may be used to meet the design criteria of a particular implementation.

Besides the counter-section-specific enable signals (ENSECTION1-k), circuit 300 also generates an enable sub-counter control signal, which generally is a combination of EN1 and a specific test mode signal (e.g., TEST2). For a particular application, the synchronous counter section reset signal SYNCRSTB may be generated by a circuit 312 in response to the signal CNTRSTb and the signal CONT-MODE2. In one example, the circuit 312 may be a logic AND gate with one of the inputs inverted, however, other types of logic gates may be used to meet the design criteria of a particular application.

The various signals are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. An apparatus comprising:
    a memory configured to read and/or write data to/from one or more ports;
    a first circuit configured to bi-directionally transfer data between a plurality of external I/O lines and a plurality of internal I/O lines connected to one or more of said plurality of ports, in response to a plurality of bus matching format signals, wherein said first circuit comprises an input/output multiplexer/demultiplexer routing circuit controlled by (i) said bus matching format signals when in a first user controlled counter mode and (ii) one or more external signals provided by a user when in a second user controlled counter mode; and
    a second circuit configured to generate said plurality of bus matching format signals in response to a plurality of input signals, wherein said data may be transferred according to one or more word formats.

2. The apparatus according to claim 1, wherein one of said plurality of bus matching format signals is a byte address signal.

3. The apparatus according to claim 1, wherein one or more of said bus matching format signals is a words address signal, wherein said word address comprises one or more bytes.

4. The apparatus according to claim 3, wherein said address signals are generated so that one or more internal long words of a memory format can be addressed to an individual byte level as well as one or more individual multiples of bytes.

5. The apparatus according to claim 3, wherein one of said plurality of bus matching format signals is a test mode dependant endian control signal.

6. The apparatus according to claim 5, wherein one or more submultiples of an internal width format can be addressed and sequenced in and/or out of the memory in an increasing or decreasing order, depending on the state of said endian control signal.

7. The apparatus according to claim 1, wherein said second circuit comprises an endian-controlled sub-counter.

8. The apparatus according to claim 1, wherein said one or more bus matching format signals are generated in response to one or more bus format select signals.

9. The apparatus according to claim 1, wherein said apparatus is appended to a least significant rank of an address counter register of an SRAM.

10. The apparatus according to claim 1, wherein said memory comprises an SRAM.

11. The apparatus according to claim 1, wherein said memory comprises a synchronous or asynchronous memory.

12. An apparatus comprising:
    means for bi-directionally reading and/or writing data to/from one or more ports;
    means for bi-directionally transferring data between a plurality of external I/O lines and a plurality of internal I/O lines connected to one or more of said plurality of ports, in response to a plurality of bus matching format signals; and
    means for generating said plurality of bus matching format signals in response to a plurality of input signals, wherein said data may be transferred according to one or more word formats, wherein said means for bi-directionally transferring data comprises an input/output multiplexer/demultiplexer routing circuit controlled by (i) said bus matching format signals when in a first user controlled counter mode and (ii) one or more external signals provided by a user when in a second user controlled counter mode.

13. A method for reading and/or writing data to/from one or more ports comprising the steps of:
    (A) bi-directionally transferring data between a plurality of external I/O lines and a plurality of internal I/O lines connected to one or more of said plurality of ports, in response to a plurality of bus matching format signals;
    (B) generating said plurality of bus matching format signals in response to a plurality of input signals, wherein said data may be transferred according to one or more word formats; and
    (C) controlling a routing of said data by (i) said bus matching format signals when in a first user controlled counter mode and (ii) one or more external signals provided by a user when in a second user controlled counter mode.

* * * * *